(12) United States Patent
Moujdin

(10) Patent No.: US 10,935,474 B1
(45) Date of Patent: Mar. 2, 2021

(54) MEMBRANE FILTER DEVICE

(71) Applicant: King Abdulaziz University, Jeddah (SA)

(72) Inventor: Iqbal Ahmed Moujdin, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/936,650

(22) Filed: Jul. 23, 2020

(51) Int. Cl.
*G01N 1/40* (2006.01)
*B01D 63/06* (2006.01)
(Continued)

(52) U.S. Cl.
CPC ............... *G01N 1/40* (2013.01); *B01D 61/08* (2013.01); *B01D 61/18* (2013.01); *B01D 61/28* (2013.01);
(Continued)

(58) Field of Classification Search
CPC .... B01D 25/00; B01D 25/001; B01D 25/003; B01D 25/02; B01D 25/04; B01D 25/08; B01D 25/30; B01D 29/00; B01D 29/0002; B01D 29/0004; B01D 29/0018; B01D 29/002; B01D 29/0029; B01D 29/0034; B01D 29/0036; B01D 29/0038; B01D 29/009; B01D 29/01; B01D 29/05; B01D 29/11; B01D 29/30; B01D 29/303; B01D 29/306; B01D 29/90; B01D 35/00; B01D 35/02; B01D 35/027; B01D 35/0276; B01D 35/30; B01D 35/306; B01D 35/308; B01D 35/34; B01D 35/303; B01D 63/00; B01D 63/08; B01D 63/065; B01D 2201/00; B01D 2201/04; B01D 2201/0415; B01D 2201/287; B01D 2201/301; B01D 2201/302; B01D 2201/304; B01D 2201/305; B01D 2201/306; B01D 2201/307; B01D 2201/40;
(Continued)

(56) References Cited

U.S. PATENT DOCUMENTS 4,460,468 A * 7/1984 Morgan ................. B01D 29/23
 210/445
4,790,942 A * 12/1988 Shmidt .................. B01D 35/06
 210/650

(Continued)

*Primary Examiner* — Clare M Perrin
(74) *Attorney, Agent, or Firm* — W & C IP

(57) ABSTRACT

Provided herein is a membrane filter device comprising a cell top cover (A, Y) and a cell bottom cover (B, Z) covering the device, a flexible tube (35, E, F) whereas at the end of the tube, a nozzle jet (22) is also secured via conical reducer to produce upper Reynold's number and for distributing the feed fluid, within the hex hollow chamber (C, X) for storing and receiving feed fluid, a reducer chamber (C, R1, R2) for storing and receiving permeate filtrated fluid, a connector (32, 53, 56) connecting both feed chambers (A, Y, Z) and reducer chambers (A, Y, Z), a membrane assembly (M/F) comprising a layer of membrane (130) sandwiched by a pair of seal rings (P1, OR, P2) and a layer of support net (MS) for securing said membrane (M/F). Most of the joints are connected using threaded joint and flow pressure, therefore no external clamp, nuts or bolts is needed. The flexible tube and the cylindrical shape ensure uniform flow in chambers. The apparatus is therefore a user-friendly and steadfast membrane filter device.

13 Claims, 5 Drawing Sheets

(51) Int. Cl.
  *B01D 61/36* (2006.01)
  *B01D 61/28* (2006.01)
  *B01D 61/18* (2006.01)
  *B01D 61/08* (2006.01)
  *B01D 63/08* (2006.01)
  *B01D 69/10* (2006.01)
  *B01D 69/06* (2006.01)
  *B01D 69/04* (2006.01)

(52) U.S. Cl.
  CPC ......... *B01D 61/366* (2013.01); *B01D 63/063* (2013.01); *B01D 63/065* (2013.01); *B01D 63/087* (2013.01); *B01D 69/04* (2013.01); *B01D 69/06* (2013.01); *B01D 69/10* (2013.01); *B01D 2311/14* (2013.01); *B01D 2311/16* (2013.01); *B01D 2313/025* (2013.01); *B01D 2313/04* (2013.01); *B01D 2313/08* (2013.01); *B01D 2313/14* (2013.01); *B01D 2313/143* (2013.01); *B01D 2313/20* (2013.01); *B01D 2313/21* (2013.01); *B01D 2313/22* (2013.01)

(58) Field of Classification Search
  CPC .... B01D 2201/4023; B01D 2201/4038; B01D 2201/4046; B01D 2201/4076; B01D 2201/4092; B01D 2201/44; B01D 2201/46; B01D 2201/10; B01D 2265/00; B01D 2265/02; B01D 2265/021; B01D 2265/027; B01D 2265/029; B01D 2267/00; B01D 2267/30; B01D 2267/40; B01D 2267/60; B01D 2313/00; B01D 2313/02; B01D 2313/04; B01D 2313/06; B01D 2313/08; B01D 2313/13; B01D 2313/20; B01D 2313/21; B01D 61/18; B01D 69/00; B01D 69/06; B01D 69/10; B01D 65/00; B01D 65/003
  USPC ................................. 210/153, 230, 232, 86
  See application file for complete search history.

(56) References Cited

U.S. PATENT DOCUMENTS

| | | | |
|---|---|---|---|
| 4,876,013 A * | 10/1989 | Shmidt | B01D 35/06 210/650 |
| 5,064,529 A | 11/1991 | Hirayama et al. | |
| 6,059,970 A | 5/2000 | Kohlheb et al. | |
| 6,592,152 B1 * | 7/2003 | Nejigaki | B01D 65/00 285/148.23 |
| 7,241,382 B2 | 7/2007 | Gordon | |
| 7,425,265 B2 | 9/2008 | Schoendorfer | |
| 2009/0151470 A1 | 6/2009 | Puppini et al. | |
| 2012/0247337 A1 * | 10/2012 | Taylor | B01D 19/0031 96/6 |
| 2012/0305460 A1 * | 12/2012 | Sharir | C02F 11/122 210/106 |
| 2016/0096147 A1 * | 4/2016 | Smelley | C02F 1/003 210/791 |

* cited by examiner

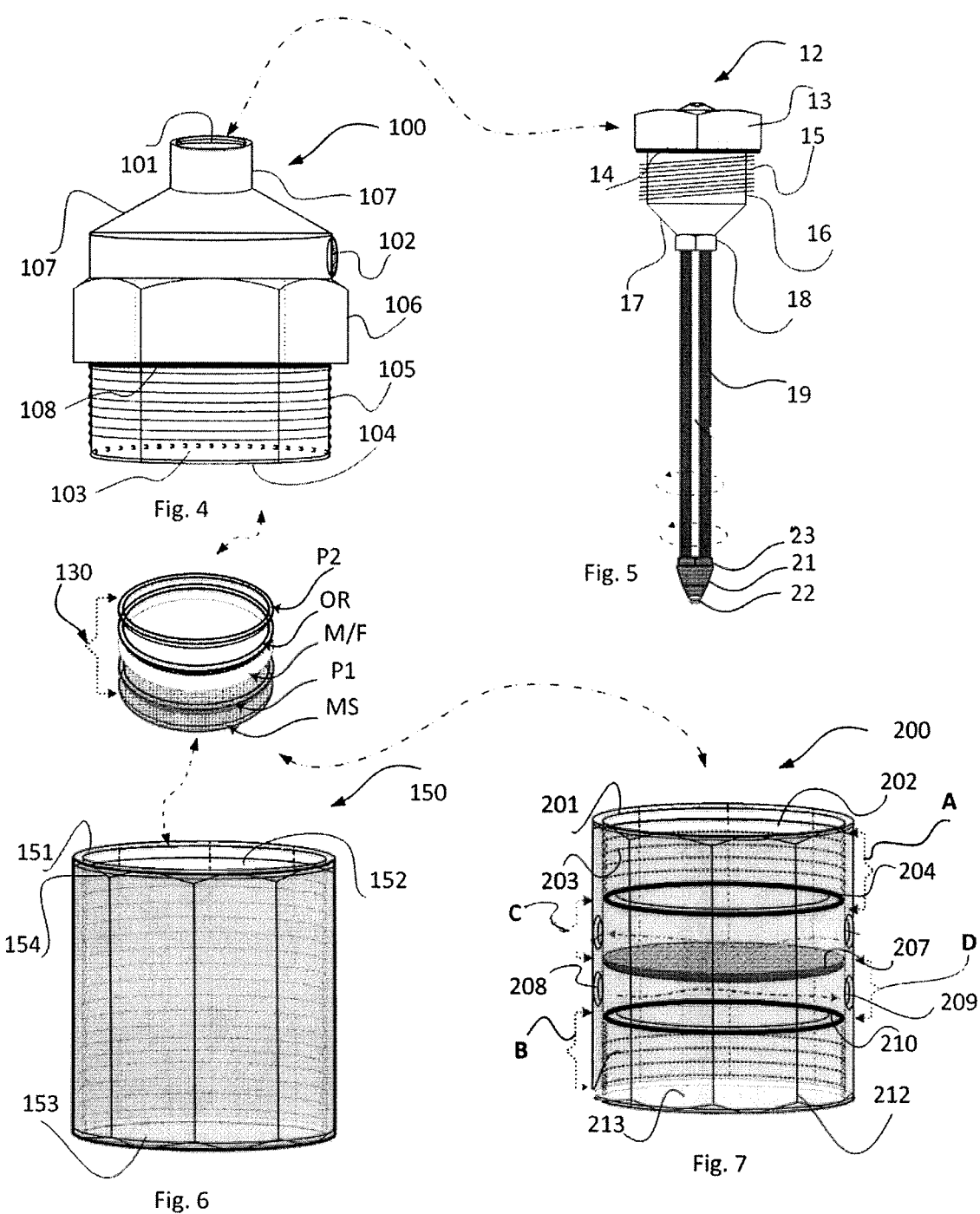

MEMBRANE FILTER DEVICE

BACKGROUND OF THE INVENTION

Field of the Invention

The present invention relates to an efficient and steadfast filtration device, more particularly a membrane filter device.

Description of Related Arts

Filtration systems are widely used for separation of impurities from fluid for example in water purifications, beverage processing, wastewater treatment and other separation applications. This is usually done by interposing a medium such as a semi-permeable or permeable membrane through which only fluid with smaller particle sizes can pass in order to reject impurities (substances) from the fluid. In a general setup of a membrane system, a pump forces the contaminated fluid towards the membrane. A small amount of fluid permeates the membrane as a product fluid while the remaining fluid portions will leave the module as concentrated fluid. The membranes are of different materials, characteristics, various pore sizes and distribution in order to reject different sizes and types of impurities or contaminants in the process fluids. The membranes' characteristics also depend on the technique used for membrane synthesis and composition of the membrane polymer solution.

The most common membrane filtration systems are the dead-end filtration and cross flow filtration systems. Dead end filtration is when oversized particles cannot pass through a filtering structure or membrane and are left behind on the membrane, while fluid and small particles can pass through the membrane and, become filtrate. In cross flow filtration, the feed flow travels tangentially across the surface of the filter structure or membrane, the smaller particles and fluid passes through the membrane as permeate or filtrate, while oversized particles are retained on the feed side as retentate. Crossflow filtration can operate longer than dead end filtration as the trapped particles are flushed off from the filter structure or membrane during the filtration process, thus, minimizing clogging of membrane pores. These two concepts can be categorized into reverse osmosis (RO), nanofiltration (NF), ultrafiltration (UF), dialysis, microfiltration (MF), gas separation (GS), pervaporation (PV) and others. These methods can be differentiated by their fluid flows, uses of pumps, characteristic of membranes and others.

The presence of a membrane testing cell is vital in achieving good performance of membrane. A membrane testing cell is required in the filtration industries as the testing cell is used to monitor, to deliver a desired flow rate, pressure in a membrane system. A complete membrane system is generally huge, requires high energy consumption and high fluid flow as well as bigger membrane size. Therefore, testing of a membrane in this full-size membrane system can be very expensive. Therefore, there is a need for a cost-effective membrane testing device which can precisely simulate the flow in a full-size membrane system in order to correctly analyze the membrane performance.

There are varieties of membrane testing cells available in the market nowadays. However, several of these cells have one or more problems or limitations. An example of a membrane testing device is U.S. Pat. No. 4,846,970, which is a crossflow filtration membrane test unit. The cited patent has a top cell body and a bottom cell body which contain cavities for feed fluid and permeate fluid. The cell is held together by an external hydraulic clamp. The hydraulic pressure also provides the O-rings the force to clamp on and fix the membrane. However, the membrane test unit has a major drawback which is uneven feed fluid velocity and pressure in the feed spacer cavity. Another problem is the hydraulic clamp which causes undesired flow of water towards the permeate cavity. This happens when the device is temporarily shutoff, the hydraulic pressure will force fluid to permeate past the membrane. The device requires a relatively expensive hydraulic pump in order for the system to function which is not cost-effective. Therefore, there is a need for a membrane testing device which can distribute the flow evenly in the feed chamber to provide even flow velocity and pressure on the membrane. There is also a need for a membrane testing device without an external hydraulic or pneumatic clamping device.

Another example is U.S. Pat. No. 7,279,215 B2, which is an integrated assembly for selectively transferring a constituent from or to a fluid. The cited patent assembles one or more flat sheet membranes connected in the interior region of a cassette which is later sealed together using pressure sensitive adhesive tape, thermal bonding adhesive bonding or other types of bonding to prevent fluid leakage. The membrane is permanently sealed to the cassette. Therefore, the cited patent is not cost effective as for every test carried out, a new cassette is required. Therefore, there is a need for a relatively low cost and cost-effective membrane testing device, preferably for all kinds of membrane applications.

One more example is U.S. Pat. No. 5,064,529, which is a membrane filter testing apparatus. The cited patent has a membrane filter wetted with liquid accommodated in a housing. The primary side of the membrane is pressurized by gas at a determined rate. The apparatus includes valves, housing, gas source, sensors and others to get more precise result readings. However, this causes the cited apparatus to be hard to assemble and detach. Additionally, the cited apparatus is big in size which is not convenient and takes up a lot of space for example in a small lab. Therefore, there is a need for user friendly membrane testing devices which can be assembled and detached easily.

SUMMARY OF INVENTION

It is an objective of the present invention to provide an efficient and steadfast membrane testing device for all kinds of separation applications which ensures that the flow in the feed chamber is an even flow pressure and velocity on the membrane.

It is also an objective of the present invention to provide a membrane testing device without the need of external hydraulic or pneumatic clamp and without the need of nut and bolt. In some embodiments, the cell top cover and cell bottom cover are held together by threaded joint.

It is also another objective of the invention to provide a reliable and steadfast membrane testing device for all filtration testing, preferably all kinds of membranes and filter testing.

It is also another objective of the invention to provide an easy and faster assembly mechanism of membrane filter testing device It is also another objective of the invention to provide filtration elements fragments to be sterilized in autoclave, UV and microwave, accordingly.

It is also another objective of the invention to provide a reliable and persistent complementary membrane testing device, whereas the standard filter or membrane can run with the tailored filter or membrane sample at a time with same conditions using one pump.

It is also an objective of the present invention to provide a membrane testing device that should be standing at low pressure to high pressure and low temperature to high temperature.

It is a further objective of the present invention to provide a membrane and filter testing device which is cost-effective.

It is another objective of the present invention to provide a membrane and filter testing device which is energy efficient and user friendly and can be assembled and detached easily.

It is another objective of the present invention to provide a filtration device that is useful from small applications to large applications.

Accordingly, these objectives may be achieved by following the teachings of the present invention. In some embodiments, the present invention relates to a membrane filter device comprising a cell top cover and a cell bottom cover covering the device, a flexible tube for distributing the feel fluid, a feed chamber for storing and receiving feed fluid, a reducer chamber for storing and receiving permeate filtrated fluid, a connector connecting both feed chamber and reducer chamber, a membrane assembly comprising a layer of membrane sandwiched by a pair of seal rings and a layer of support net for securing said membrane. Most of the joints are connected using threaded joint and flow pressure therefore no external clamp, no nut and bold is needed. The flexible pipe and the cylindrical shape ensure uniform flow in chambers. The present invention is therefore a user-friendly and reliable membrane test device.

BRIEF DESCRIPTION OF THE DRAWINGS

The features of the invention will be more readily understood and appreciated from the following detailed description when read in conjunction with the accompanying drawings of the preferred embodiment of the present invention, in which:

FIG. 4 is a broad view of the upper or lower part for feed, permeate flux, draw solution, etc;

FIG. 5 is a broad view of a feed or draw solution inlet socket, including the attachment of a flexible tube with a nozzle tip;

FIG. 6 is a broad view of a hexagonal (hex) hollow cylinder for upper (feed or draw solution) and lower head (permeate or permeate flux);

FIG. 7 is a broad view of a dedicated hex hollow chamber for upper (feed and permeate/permeate flux) and lower head (feed and permeate/permeate flux).

DETAILED DESCRIPTION OF THE INVENTION

Figures 1A, 1B, 1C:
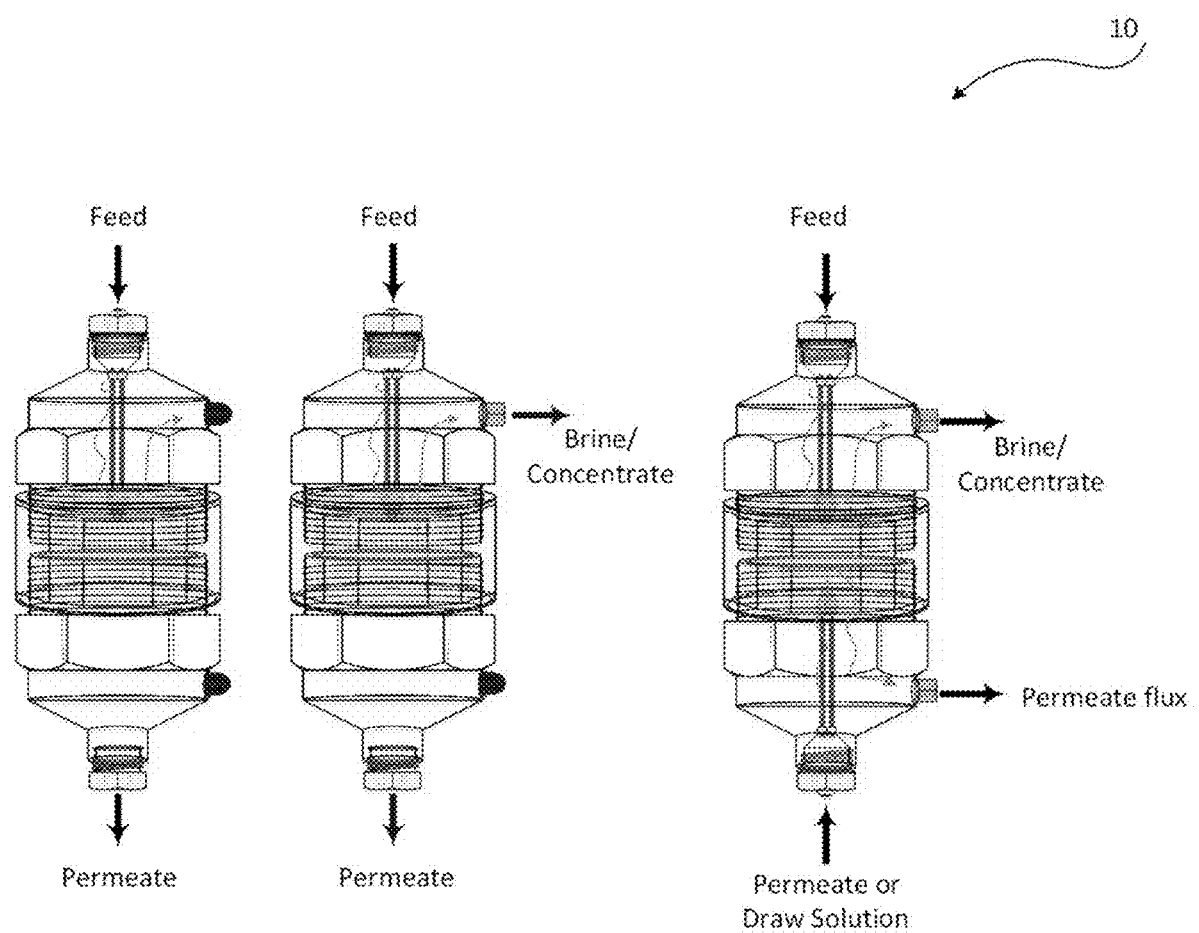
FIG. 1A-C is a schematic illustration of a membrane filter device for several kinds of applications such as (A) dead-end, (B) cross flow, and (C) osmotic pressure, forward osmosis, and pressure retarded osmosis, respectively.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. As used throughout this application, the word "may" be used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations of technical terms are used, these indicate the commonly accepted meanings as known in the technical field. For ease of reference, common reference numerals will be used throughout the figures when referring to the same or similar features common to the figures. The present invention will now be described with reference to FIGS. 1-7.

Embodiments of the present invention relate to a membrane filter device (10) including, but not limited to, the following embodiments:

A. An illustration of assembled filtration device (FIG. 1A) for dead end separation processes B. An illustration of assembled filtration device (FIG. 1B) for crossflow separation processes C. An illustration of assembled filtration device (FIG. 10) for osmotic pressure (OP), forward osmosis (FO), pressure restarted osmosis (PRO), dialysis, pervaporation processes (PV), membrane distillation (MD), membrane crystallizer (MCr), and gas separation (GS), respectively.

Figure 2:
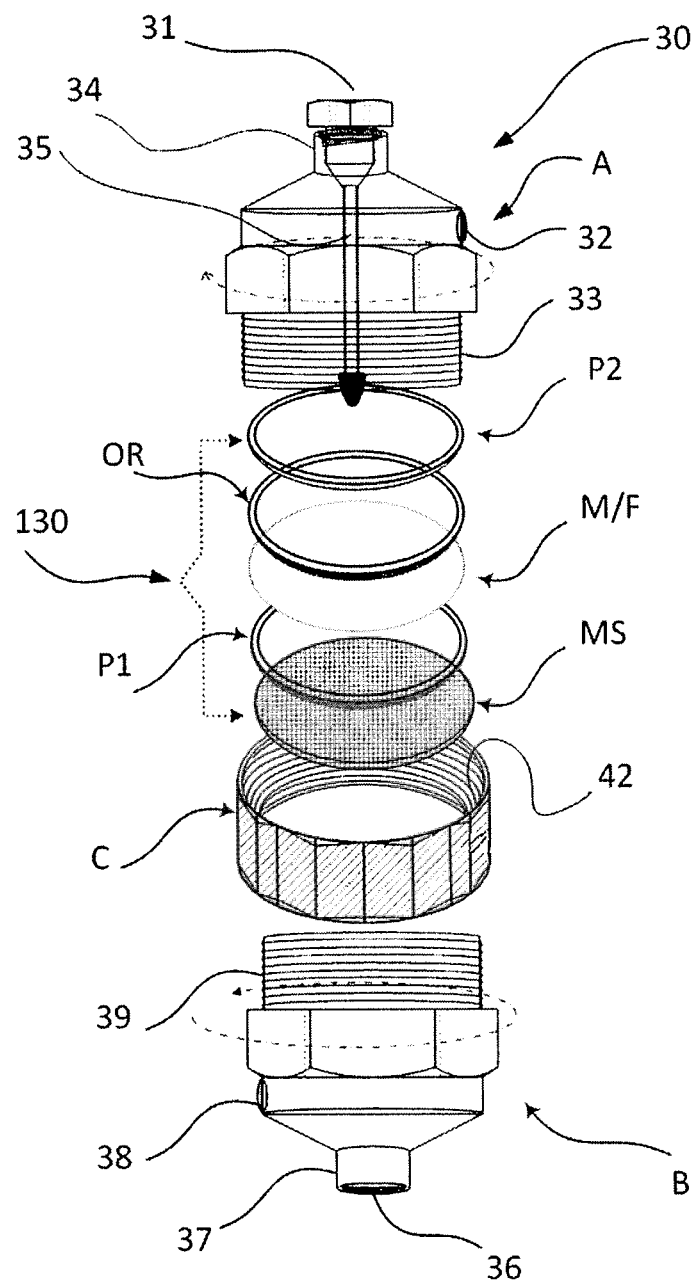
FIG. 2 is an explosion view of membrane filter device.

Referring now specifically to the drawings, a comprehensive open broad view of a membrane filter device apparatus according to the present invention is illustrated in FIG. 2 and shown generally at reference numeral 30.

1. In an embodiment, the present invention relates to a membrane filter device (30) comprising:
   i. a cell top hex cover part (30A) having a female feed port (34) for receiving male hex open-end threaded reducer (31) attached with adjustable inlet flexible tube (35) has nozzle jet spray for inflow of fluid;
   ii. further, the top cover part (30A) parallel secured under the male threaded opened head cylinder (33) including to discharge continuously concentrate fluid discharge female threaded opening end (32);
   iii. a hollow connector (30C) connected to said upper feed chamber (30A) and lower permeate chamber (30B). The hex hollow chamber has cylindrical threaded female pipe open head attached to upper hollow hex head feed part assembly (30A) and lower hollow hex head permeate cover (30B) chamber through their open heads end;
   iv. the bottom hollow hex open-end head cover said permeate chamber (30B) is a similar shape and size like upper feed chamber such as cell bottom cover part (30B) having a single neck (37) female feed lid port (36) for receiving permeate flux, further hollow hex open-end head permeate chamber parallel secured under the male threaded opened head cylinder (39) to receive continuously permeate flux. Moreover, the permeate chamber (30b) also has a threaded opening part (38), that shall apply as an exit point as permeate flux in case of membrane distillation (MD), dialysis, FO, PRO, and osmotic application, respectively;

v. Prior to assembly of the filtration device (30), inside the hollow hex open-end head cylinder or chamber, holding upper stream process said feed assembly (30A) and lower stream process said product assembly (30B). Further, inside the hollow hex open-end head chamber, first screwed the product chamber (30B) holding said a membrane mesh support (MS), a thin polypropylene (PP) OR PTFE flat gasket ring (P1), a membrane or filter (M/F), an o-ring flat gasket (OR), a thin PP flat gasket ring (P1). In the membrane assembly (130), the membrane is sandwiched (130) by a pair of seal rings (P1, OR, P2) and supported by a layer of support net (MS) to be secured to the membrane (M/F) against the pressurized flow during up stream process. The membrane (M/F) and the support net (MS) and pair of O-ring flat gaskets (P1, OR, P2) should have circular cross sections when viewed from the top so that the shape of the membrane (M/F) and support net (MS) are same with the shape of the chamber. Besides, the membrane (M/F) and the support net (MS) have almost the same overall diameter. If the membrane (M/F) and the support net (H) are in another shape, the extra part might block the threaded joint or even worse, disrupt the flow in the chambers.

2. In an embodiment, the present invention relates to a unique concept of hex nipple threaded hollow reducer (31) connector pipe fitting/adapter including a flexible silicone tube (35) comprising:
   i. the male hex hollow nipple threaded (31) reducer connector pipe fitting/adapter;
   ii. a flexible silicone hollow (35) tube connected with open end of hollow hex nipple threaded (35) reducer to said inlet tapered reducer at end of open head (31) for distributing the turbulent feed fluid evenly on to the active membrane surface (M/F);
   iii. an open end or tip of the hollow flexible silicone tube (35) is attached with a fluid jet and the jet has an open-end nozzle tip which helps the hollow flexible silicone tube (35) to rotate vibrantly and create an upper value of Reynolds number inside the chamber.

In a preferred embodiment of the present invention, said cell top cover (30A), cell bottom cover (30B), hollow hex female feed chamber (30C) and tapered hollow hex open-end head chamber (30A, 30B) including with hex nipple threaded hollow reducer (31) connector pipe fitting are in cylindrical shape.

Referring to FIG. 2, a preferred embodiment of the present invention, said cell top cover (30A) and bottom cover (30A) including the male hex nipple threaded (31) reducer connector pipe fitting/adapter, cell bottom cover (30B) may also be included the male hex nipple threaded (31) reducer connector pipe fitting/adapter, hollow feed chamber (30C) are connected co-axially.

Referring to FIG. 2, a preferred embodiment of the present invention, inside the female hex hollow chamber (30C), the membrane assembly (130) sandwiched by a pair of seal rings (P1, OR, P2) and supported by a layer of support net (MS) are between the top cover (30A) and bottom cover 30B.

Referring to FIG. 2, a preferred embodiment of the present invention, it is said that the active membrane filter surface (M/F) should always be feed cover side (30A). In a preferred embodiment of the present invention, said cell top and bottom hex cover (30A and 30B) and said hex tapered hollow feed and permeate chamber (30A and 30B) are mounted together by adhesive or threaded joint.

Figure 3A:
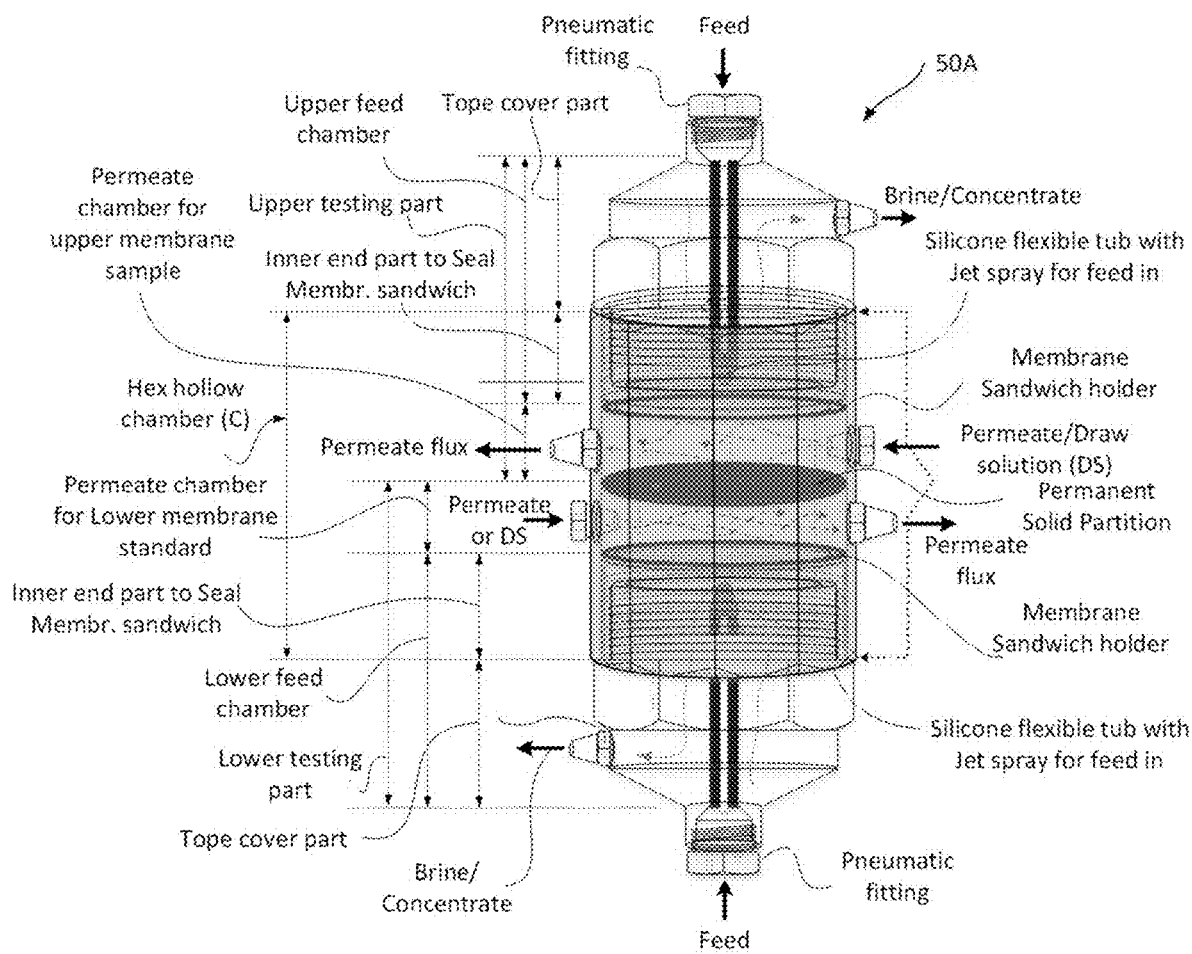
FIG. 3A-B is a schematic illustration of a complementary and dedicated membrane filter device and process.

Referring now specifically to FIG. 3a, an elevational view and comprehensive illustration of a complementary membrane filter device and process, according to the present invention, is illustrated in FIG. 3a and shown generally at reference numeral (50A). The upper part and lower part of the prior art (50A) embodiment is like the previously described preceding embodiment of the filtration device (30) is shown in FIG. 2, except the central hex hollow chamber (50C), whereas there are three partitions within the empty hex chamber to accommodate two feed covers, including two permeate flux chambers. The first two upper and lower partitions said the beam collar is engaging the lower open-end part of both feeds cover are connected co-axially said a bolted force within the hex hollow female chamber and maintain the seal for membrane sandwich (130) between chamber beam collar and open-end part of feed cover. Further, the two feed covers are located outside the central hex chamber and are engaging the flexible tube within the centre and maintaining the rotation on to the membrane surface.

Nevertheless, the preferred embodiment relates to a complementary filtration testing device (50A) that is suitable for any membrane sample performance investigation, and parallel run the study of membrane standard within the filtration device (50A).

Figure 3B:
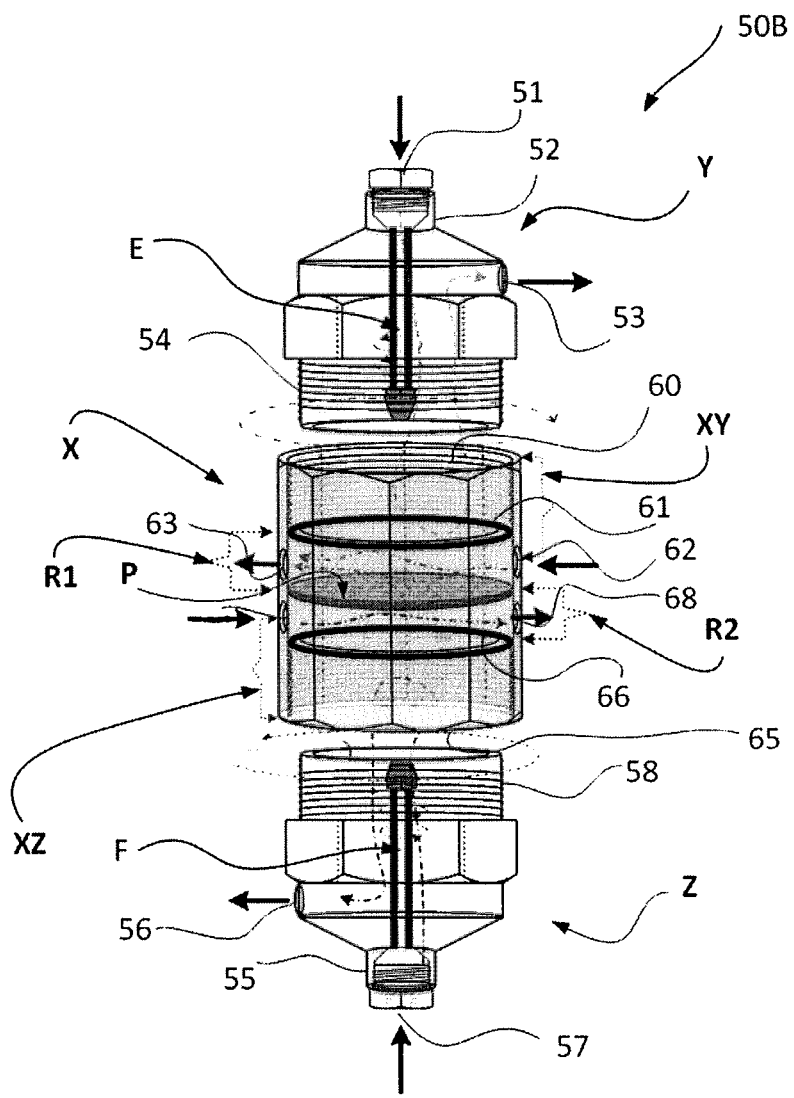

Now referring to FIG. 3b and summarised generally at reference numeral (50B), an exploded perspective view of complementary filtration assembly and each of assembly elements are discussed separately below.
   i. As best shown in the illustration of reference 50B, the top hex cover housing (Y) may assign to the investigation of the membrane sample performance. The upper hex cover housing (50B) whereas further assign reference for hex (Y), the purpose of hex design to provide a comfortable grip to attach or detach of upper cover threaded open head from upper open-end hex hollow chamber (XY). Moreover, top hex cover also provides a tapered reducer plan to provide uniform fluid pressure within the room. Further, within the upper lid, a withdrawal flow channel (53) is allocated to exit the concentrate or brine solution. The top cover housing having a single neck female feed open-end (52) for receiving male hex nipple threaded reducer (51) attached with adjustable inlet flexible tube (E) with water jet nozzle spray for an inflow of feed fluid. The nozzle jet (E) spray is hanging within the centre of upper lid housing and on to the membrane's active surface, and there is gap of about 3 mm, e.g. 1-5 mm (where the narrow laminar flow point accelerated), is provided between the membrane surface and jet spray. Due to the small gap between the membrane surface and of the jet nozzle, the flexible tube becomes unstable and starts rotating inside the upper cover chamber (Y). The purpose of this innovative approach to creating high turbulence fluid flow on to the membrane surface and to keep disengaging the solutes or suspended particles deposited on to the membrane surface.
   ii. Referring to FIG. 3b and reference numeral 50B, a central hex hollow open-end feed chamber (X) is provided, within the centre of chamber (X), a permanent partition (P) is provided between the two open beam collars (61 and 66). The purpose of the permanent partition (P) is to assign two permeate rooms (XY and XZ) for two membrane samples. The chamber (X) open-end collar beam (61) is to provide a hanger (61 and 66) for the membrane sandwich (130) and room (XY) for the male upper cover open head (Y). The permeate room will receive the permeate flux from an open-end collar beam (61). Further, within the permeate room, two accessible open points (62 and 63) is provided. The open channel may be secure for receiving the permeate flow in (62), and the withdrawal channel (63) may be for permeate flux flow out (63).

iii. Referring to the lower part of FIG. 3*b*, a lower hex cover housing (Z) may assign to the investigation of the standard membrane sample performance, whereas a parallel membrane test can be run using one pump force. The lower hex cover housing (Z) has also an open female head, and the second membrane sandwich (130), preferably the standard membrane sample, can be bolted between lower beam collar and lower hex cover open head within the hollow chamber (XZ). In house (XZ) the lower hex cover (Z) is providing a room to receive the fluid feed, a reducer (51 and 57) which have adjustable inlet flexible tube (F and E) with nozzle jet spray, channels for feed fluids in (52 and 55) and concentrate flow out (53 and 56), respectively.

In the present invention, there is disclosed a membrane filter device as illustrated in FIG. 1 and FIG. 3*a* and summarised generally at reference numeral (10 and 50A). The membrane filter device (10 and 50A) of the present invention is user-friendly and reliable for analysing the performance of various filters or membranes by cross flow or dead-end filtration.

The present invention may be used to determine the performance of various tailored filters or tailored membranes in terms of product recoveries and percentage separation. Using the present invention, parameters, product flux and solute rejections can be determined, especially for reverse osmosis (RO), nanofiltration (NF), ultrafiltration (UF), dialysis, microfiltration (MF), membrane distillations (MD), gas separation (GS), pervaporation (PV) membranes. The present invention may also be used for dialysis process, forward osmosis (FO) process and pressure retarted osmosis (PRO) process, respectively. Moreover, it can also be utilized for absorbent, adsorbent, adsorption, desorption processes.

Now referring to each elemental part used in the filtration device as discussed separately below with a diverse reference number.

Referring to FIG. 4, an embodiment of the present invention comprises a prime hex tapered hollow feed and permeate chamber (100) including an open-collar female lid (101) to secure the male-female NPT threaded hex tapered bushing for receiving the feed liquid or gas flow inside the chamber (100). Further, within feed and permeate room (100) is also provided a female threaded open collar (102) to secure a male threaded hex fitting preferably pneumatic fitting to flow out the concentrate or brine and in case of FO, PRO, MD, and dialysis process said permeate flux as well (102) from the hex chamber (100).

As illustrated in FIG. 4 and yet referring reference (100), an open-head male threaded (105) bottom cylinder (103), and an end wall gauge (104) said open-end cylinder wall thickness (104) is related to control the membrane sandwich (130) and seal coaxially within the chamber. The open-head male cylinder thread (105) is relevant to attach or detach with the open-end hollow cylinder, and above the male cylinder thread (105), a narrow gap (108) is provided to secure the O-ring gasket. Yet referring the reference 100 of FIG. 4, the hex collar copses (106) is for a secure grip to twist the cylinder clockwise or anticlockwise against the central female threaded hex chamber. Again, referring to the FIG. 4 of reference 100 the top part of the cover also provides a tapered reducer plan (107) to deliver uniform fluid pressure within the cylinder room.

In a preferred embodiment of the present invention, said male-female NPT threaded hex tapered reducer as illustrated in FIG. 5, and summarised generally at reference numeral (12). The hex hollow reducer top part (13) is secured to an open head pneumatic fitting to access the feed fluid. Under the hex head of reducer, a narrow gap (14) is provided for O-ring gasket. Further, the reducer has prolonged a fine threaded (15) wall (16) related to attached with open-head neck female lid (101) of hex tapered hollow feed or permeated chamber (here referring to FIG. 4). The hollow reducer also provides a tapered wall (17), whereas an open-end connector (18) is related to attach a flexible hollow tube, preferably a silicone tube (19). Yet referring to FIG. 5, at the end of the silicone tube, a small tapered reducer (21) has attached via hex pneumatic fitting (23), and at the end of the conical reducer, a nozzle jet (22) is also secured to produce upper Reynold's number.

In a preferred embodiment of the present invention, said female hex hollow chamber, as illustrated in FIG. 6, and summarised generally at reference numeral (150). The hex hollow chamber is provided two open-head (152 and 153), whereas hex-wall (154) is tenable at alongside the chamber. The approach of hex collar copses (106) at the outside of the hollow chamber to provide a secure handgrip onto the chamber and the approach of hex collar copses (106) is for a secure grip to twist the female hollow cylinder clockwise or anticlockwise against the upper or lower hex tapered hollow feed and permeate chamber (100). The hex hollow chamber has an appropriate wall thickness (151) to accommodate a membrane sandwiched (130) between the upper and lower hex tapered hollow feed and permeate cover (100) of FIG. 4.

In a preferred embodiment of the present invention, relate to complementary filtration assembly element, said a female hex hollow chamber, as illustrated in FIG. 7, and summarised generally at reference numeral (200). The complementary hex hollow chamber provides three-permanent partitions (204, 207, and 210), whereas, within the center of the hollow room among the three partitions, one of the barriers is a compact flat plat (207). Perhaps, rest of the two-partition said open-aperture collar-beam (204 and 210) are secure to hold the membrane sandwiched (130) within the chamber. The dedication of the permanent compact flat plat (207) is to conceive or provide rooms (A and B) to contained two hex tapered hollow cover (as illustrated in FIG. 4) for to flow in of two feed liquids, and two permeate (C and D) said also permeate flux. The top portion (A) may receive a hex tapered hollow cover from an open head of the hollow chamber (202) and could be assigned to the investigation of the tailored membrane or filter sample performance. The room (C) is assigned to receive permeate from the upper portion (A) and fled out exit routes (203 and 204).

As illustrated in FIG. 7 and yet referring to reference (200), an open-head male threaded (105) bottom cylinder (213), the lower open head of hex hollow chamber (200) is secured to receive second membrane sandwiched (130) and hex tapered hollow cover. The lower open head of hex hollow chamber (200) to provide a room (B) for feed liquid flow in and out in between the secured membrane sandwiched (130) and lower hex chamber (here referring FIG. 4). Within the open head of hex hollow chamber, under the membrane sandwiched or said below the open-aperture collar-beam (210), a room (D) is secured to receive the permeate from an open-end of the membrane sandwich (130). Further in case of MD, FO, PRO, and dialysis process the permeate chamber is secured a female open head (208 and 209) for male pneumatic fitting to access the draw solution and flow out the permeate flux.

As illustrated in FIG. 7, the outside of the female hex hollow chamber collar copses (212) is provided alongside the chamber. The approach of hex collar copses (212) at the outside of the hex hollow chamber to provide a secure handgrip onto the chamber and the approach of hex collar copses (212) is for a secure grip to twist the hex hollow chamber clockwise or anticlockwise against the upper or lower hex tapered hollow feed and permeate chamber (100). The hex hollow chamber has an appropriate wall thickness (151) to accommodate membrane sandwiched (130) between the upper and lower hex tapered hollow feed and permeate cover (100) of FIG. 4. The hex hollow chamber has an appropriate wall thickness (201) to hold considerable applied pressure against the membrane sandwiched (130) and upper or lower cover assembly.

In a preferred embodiment of the present invention, said cell upper or lower hex tapered hollow cover (30A, 30B, 50B-Y, 50B-Z and 100) that have an open-head male threaded reducer chamber (33, 39, 54, 58 and 105) an open neck lid (34, 52, 55, and 101) and further said male-female NPT threaded hex tapered reducer (31, 51 and 12) is mounted together by adhesive or threaded joint with upper or lower hex tapered hollow cover. The exploded view of the present invention is shown in FIG. 2, FIG. 3*b*, FIG. 4, FIG. 5, FIG. 6, and FIG. 7, respectively. The comprehensive view of central female hex hollow chamber (C, X, 150 and 200), the cell upper or lower hex tapered hollow cover, the flexible tube (35, E, F, and 19), the upper or lower hex tapered hollow feed chamber (A, Y, Z, and 100), the central female hex hollow chamber (C, 150), the complementary central female hex hollow chamber (X, 200), the lower hex tapered hollow cover as permeate chamber (B, Z) and the two permeate flux rooms within central female hex hollow chamber (50B-X and 200-C, 200-D) are shown in FIG. 2, FIG. 3*b*, FIG. 4, FIG. 5, FIG. 6, and FIG. 7, respectively.

A cell upper or lower hex tapered hollow cover (30A, 50B-Y, 50B-Z and 100) having an open-neck female lid feed port (34, 52, 53, and 101) for engaging with an inlet male-female NPT threaded hex tapered reducer (31, 51 and 12) for inflow of feed fluid and out flow of concentrate or brine. A flexible tube (35, E, 19) is connected to NPT threaded hex tapered reducer inside the upper or lower hex tapered hollow cover for distributing the feed fluid evenly. Feed fluid is pumped into the apparatus from the flexible tube. The flexible tube distributes the fluid on a test membrane filter (M/F) evenly. Without the flexible tube, the feed fluid may flow directly onto the membrane (M/F) on one spot. The fluid pressure and velocity on the spot will be higher than the other spots on the membrane, creating uneven flow thus giving imprecise results and spoiling the membrane (M/F). As the fluid reaches the flexible tube, the pressure of the fluid will force the outlet of the flexible tube (F) to move, spreading the feed fluid around, creating a more stable flow pressure and velocity on the membrane (M/F). Furthermore, the flexible tube may be placed above the membrane (M/F) surface to allow free movement of the flexible tube due to fluid force when the cell is in operation. Therefore, that the feed fluid stream can be distribute evenly on the membrane (M/F) but not focusing around a short range of radius. It was also found that after a considerable time of membrane testing, rejected particles are evenly distributed over the membrane (M/F) surface.

A cell upper or lower hex tapered hollow cover (30A, 30B, 50B-Y, 50B-Z and 100) secured the membrane sandwiched (130) with the open head hex hollow chamber top (C, 150) including a fluid discharge channel (32, 53, and 152) coupled to the body of said hex tapered hollow feed chamber (30A, 30B, 50B-Y, 50B-Z and 100) and a male threaded end (33, 54, 58) at the bottom end. Said fluid discharge channel (32, 53, and 152) is for discharging fluid from the feed chamber during crossflow filtration.

A membrane assembly (130) including a layer of membrane (P1, OR, P2) sandwiched by a pair of seal rings (P1, OR, P2) and supported by a layer of support net (MS) below the membrane (M/F) for securing the membrane (F) against the pressurized fluid flow. The membrane (M/F) and the support net (MS) should have circular cross sections when viewed from the top so that the shape of the membrane (M/F) and support net (MS) are same with the shape of the chamber. Besides, the membrane (M/F) and the support net (MS) have almost the same overall diameter. If the membrane (M/F) and the support net (MS) are in another shape, the extra part might block the threaded joint or even worse, disrupt the flow in the chambers.

Prior to placing the membrane sandwich (130), first the lower hex tapered hollow reducer part (33, 39, 54, 58 and 105) should be screwed clockwise within the lower open end of the central hex hollow chamber (C, 200). After the fitting of lower cover, the membrane sandwich (130) is placed from the top head of central hex hollow chamber. Later, the hex tapered hollow reducer chamber (33, 39, 54, 58 and 105) is inserted from the upper open head of central hex chamber (C, 200). The membrane sandwich (130) is held by the screw between the lower and upper reducer chamber within the central hex hollow chamber.

In the preferred embodiment, the cell upper and lower tapered hollow reducer chamber (33, 39, 54, 58 and 105), open head of central hex chamber (C, 200), and male-female NPT threaded hex tapered reducer are in cylindrical shape and are connected coaxially. The cylindrical shape of the apparatus is to ensure the uniform fluid pressure in the chambers. The cell upper and lower tapered hollow reducer chamber (33, 39, 54, 58 and 105), open head of central hex chamber (C, 200), and male-female NPT threaded hex tapered reducer can be mounted together by adhesive or threaded joint. The cell upper and lower tapered hollow reducer chamber (33, 39, 54, 58 and 105), open head of central hex chamber (C, 15, 200), and male-female NPT threaded hex tapered reducer are preferred to be fitted together by threaded joint during either low or high pressure operation.

In one embodiment, where the present invention is used for dead end filtration, the fluid discharge channel (32, 38, 53, and 152) of said feed tapered hollow reducer chamber (33, 39, 54, 58 and 105) and the outlet port (32, 38, 53, and 152) are sealed. The feed fluid will enter the open-neck female lid feed port (34, 52, 53, and 101) of hex hollow chamber through the inlet pipe male-female NPT threaded hex tapered reducer. Part of the fluid with smaller particle size, depending on the membrane pores size, will permeate through the membrane (M/F) into the reducer chamber (31) then leave the apparatus from the bottom port. Over a period of use, particles rejected by the membrane (M/F) will accumulate on top of the membrane (M/F), usually clogging the membrane (M/F) pores. Therefore, the membrane (M/F) used in dead end filtration are replaced time after time.

In another embodiment, where the present invention is used for cross flow filtration, only the outlet port (32, 38, 53, and 152) of said reducer chamber (33, 39, 54, 58 and 105)

will be sealed for the operation. The feed fluid will enter the feed chamber (33, 39, 54, 58 and 105) through the inlet male-female NPT threaded hex tapered reducer too. The fluid will be filtered by the membrane (M/F), allowing the filtrated fluid to pass through the membrane (M/F) leaving the concentrated fluid in the feed chamber (33, 39, 54, 58 and 105). This concentrated fluid is directed out from the feed chamber (33, 39, 54, 58 and 105) through the fluid discharge channel (32, 38, 53, and 152) so that the membrane (M/F) will not be clogged, prolonging the membrane (M/F) filter life. The filtrated fluid will leave the reducer chamber (33, 39, 54, 58 and 105) from the open-end of hollow chamber.

Also, referring to FIG. 2, in an embodiment, where the present invention is used for a dialysis process, the ports and channel of lower chamber (B) are not sealed. Again, the feed fluid will enter the feed chamber (A) through the inlet channel of male-female NPT threaded hex tapered reducer (31). Another inflow fluid, usually dialysate solution will enter the apparatus from the bottom port (36) of the cell bottom cover (B). The feed fluid is higher in concentration compared to the dialysate solution. Some of the substances in the feed fluid will permeate through the membrane (M/F) due to the principles of diffusion and filtration. According to diffusion, substances in higher concentration area tend to move to the lower concentration area. For filtration, small negative pressure is usually induced in the reducer chamber (A) to create pressure difference in reducer chamber (A) and the feed chamber (A). In this case, the substances from the feed fluid will permeate through the membrane (M/F) into the dialysate. These permeate substances have a size not bigger than the pores in the membrane (M/F). The feed fluid which loses some substances will then exit the feed chamber (A) from the fluid discharge channel (32), while the dialysate solution which gains some substances will leave the reducer chamber (B) from the outlet channel (38). The dialysis process is commonly used in haemodialysis process which removes extra fluid from blood, urine and other unwanted substances.

The apparatus may be made of various materials, e.g. thermoplastic or engineered polymer. For high pressure applications such as pressure driven, concentration gradient, and temperature driven filtration testing. The apparatus may be made of stainless steel.

Nevertheless, several preferred embodiments of the invention are disclosed and illustrated, it is to be patently understood that this invention is not inadequate thereto but may be multifariously embodied to practice within the scope of the following claims. Although the present invention has been described with reference to specific embodiments, it will be apparent to those skilled in the art that many variations and modifications can be done within the scope of the invention as described in the specification and defined in the following claims.

Embodiments of the disclosure include, but are not limited to, the following:

A steadfast filter device for all filtration application, comprised of cylindrical housing with one or more upper or lower hex tapered hollow cover, and an open-head hex hollow cylinder with or without central partition.

1. A membrane filter device (FIG. 4 to FIG. 7) comprising:
    a cell top hex cover part (100) having a female feed port (101) for receiving male-female NPT threaded hex tapered reducer (12). The NPT threaded hex tapered reducer (12) is attached with adjustable inlet flexible tube (19) and the tube open end fastened (23) with the nozzle jet spray (21) for inflow of feed fluid inside the top hex chamber (100);
    the upper and lower open head female hex hollow feed chambers (150, 200) secured to the cell top and bottom cover (100) including a feed fluid inlet (101) via hex tapered reducer (12) and fluid discharge channel (102) coupled to the body of said feed chamber (150, or 200);
    a cell open head of central hex chamber (150, 200) shall be secured to the cell top and bottom via open head reducer chamber (105) having a channel port (101, 102) for engaging with a channel for inflow or outflow of fluid;
    a membrane assembly (130) including a layer of membrane sandwiched by a pair of seal rings (P1, OR, P2) and supported by a layer of support net (MS) to secure the membrane (M/F) against the pressurized flow;
    characterized in that:
    said two reducer chambers (105) is inserted from the top or bottom into said hex hollow open head chamber (152, 153, 202, 213) where the top or bottom flange (104) of said reducer chamber (105) rests on said internal flange (104) of said open head chamber (152, 153, 202, 213) connector;
    within hex hollow chamber (150, 200) and in between two reducer chambers open head (105) said membrane assembly (130) is resting under reduce said flange (104) of the reducer chamber (105) and the open head chamber (152, 153, 202, 213) connector is coupled to the feed chamber (105) by threaded joint.
2. A membrane filter device according to embodiment 1, wherein said cell top or bottom cover (100), hollow feed open head chamber (150, 200) and reducer chamber (105) are in cylindrical shape.
3. A membrane filter device (FIG. 2 of reference 10) according to embodiment 1, wherein said cell top cover (A), cell bottom cover (B), hollow feed chamber (C) and reducer chambers (33, 39) are connected co-axially.
4. A membrane filter device (FIG. 2 of reference 10) according to embodiment 1, wherein said cell top and bottom cover (A, B) and said hollow feed chamber (C) are mounted together by adhesive or threaded joint.
5. A membrane filter device (FIG. 2 of reference 10) according to embodiment 1, wherein said cell bottom cover (B) and said reducer chamber (39) are mounted together by adhesive or threaded joint.

A complementary membrane filter device (FIG. 3 of reference 50B), wherein said a cell central hex hollow open-head feed chamber (X) is provided, within the centre of chamber (X), a permanent partition (P) has provided between the two open beam collars (61 and 66). The objective of the permanent partition (P) to assign two feed rooms (XY and XZ) and two permeate rooms (R1 and R2) for two membrane samples. The chamber (X) open-end collar beam (61, 62) is to provide a hanger (61 and 66) for two membrane sandwich (130) and two reducer chambers (54, 58).

Prior to assembling a filtration cell within the complementary central hex hollow chamber in preferred embodiments of the invention, first said a support net (MS) is placed on to the hanger (61, 62). Later, the membrane filter (M/F) including the pair of seal rings (P1, OR, P2), after securing the membrane sandwich (130), two reducer chambers (54, 58) is inserted from the top or bottom into said hex hollow open head chamber (60, 65) where the top or bottom open head of said reducer chamber (54, 58) rests on said internal flange (XY, XZ) of said free head chamber (60, 65) connector; within hex hollow chamber (60, 65) and in between two reducer chambers open head (54, 58) said membrane assembly (130) is resting under reduce said flange of the reducer chamber (54, 58) and the open head chamber (XY, XZ) connector also said feed rooms is coupled to the feed chamber by threaded joint.

In a preferred embodiment of the invention, within complementary hex hollow chamber (X), within the hex hollow open head chamber (60, 65) two rooms (R1 and R2) are secure said to receive filtered liquid from an open head of beam collar (61, 66) and collected from the ports (62, 63, 68, 68).

Another preferred embodiment of the invention, in case of MD, FO, PRO, and dialysis application, the draw solution can flow in from the upper port and lower port (62, 68) of permeation room (R1 and R2) and flow out permeate flux from (63, 68).

Referring to FIG. 4 and FIG. 5, but preferably referring to FIG. 5 in a preferred embodiment of the invention, said from open neck (101) of top or bottom hex hollow reducer (12) is secured a male-female NPT threaded hex tapered bushing for receiving the feed liquid or gas flow inside the chamber (100). Auxiliary, the reducer has extended a fine threaded (15) wall (16) related to attached with open-head neck female lid (101) of hex tapered hollow feed. The hollow NPT reducer has also provided a tapered wall (17), whereas an open-end connector (18) is related to attach a flexible hollow tube, preferably a silicone tube (19).

At the end of the silicone tube, a miniature tapered reducer (21) is attached via hex pneumatic fitting (23), and at the end of the conical reducer, a nozzle jet (22) is also secured to produce upper Reynold's number within the hex hollow chamber (100).

ACKNOWLEDGEMENT

This project was funded by the Science and Technology Unit, at King Abdulaziz University, Jeddah, under grant no. (UE-41-105). The inventor, therefore, acknowledges with thanks the Science and Technology Unit, King Abdulaziz University for financial support.

The invention claimed is:
1. A membrane filter device comprising:
at least one hex chamber comprising
a cell hex cover part having a female feed port for receiving a male-female national pipe thread (NPT) hex tapered reducer,
an adjustable flexible tube attached to the NPT hex tapered reducer,
a nozzle jet spray attached to an open end of the tube configured for inflow of feed fluid into the hex chamber,
a membrane assembly comprising a membrane and a seal ring on either side of the membrane supported by a support net configured to secure the membrane against pressurized flow, and
a fluid discharge channel coupled to the hex chamber,
wherein the hex chamber is connected to the cell hex cover part via an open head reducer chamber having a channel port for engaging with a channel for inflow or outflow of fluid, and
wherein the nozzle jet spray is separated from the membrane by a gap such that fluid emitted from the tube covers a majority of the membrane surface.

2. The membrane filter device according to the claim 1, wherein the reducer chamber is inserted into the hex chamber and wherein a flange of the reducer chamber rests on an internal flange of the hex chamber.

3. The membrane filter device according to the claim 1, wherein the hex chamber is connected to the reducer chamber by a threaded joint.

4. The membrane filter device according to the claim 1, wherein the cell hex cover part, hex chamber, and reducer chamber are cylindrical in shape.

5. The membrane filter device according to the claim 1, wherein the cell hex cover part, hex chamber, and reducer chamber are connected co-axially.

6. The membrane filter device according to the claim 1, wherein the cell hex cover part and hex chamber are connected by an adhesive or threaded joint.

7. The membrane filter device according to the claim 1, wherein the cell hex cover part and reducer chamber are connected by an adhesive or threaded joint.

8. The membrane filter device according to the claim 1, wherein the device comprises two hex chambers and a fixed partition arranged in between the hex chambers.

9. The membrane filter device according to the claim 1, further comprising one or more ports for receiving filtered liquid.

10. The membrane filter device according to the claim 1, wherein the NPT hex tapered reducer comprises a tapered wall such that the tube is attached via an open-end connector.

11. The membrane filter device according to the claim 1, wherein the tube is a silicone tube.

12. The membrane filter device according to the claim 1, wherein a miniature tapered reducer is connected to an end of the tube via hex pneumatic fitting.

13. The membrane filter device according to the claim 1, wherein the gap is 1-5 mm.

* * * * *